United States Patent
Sano et al.

(10) Patent No.: US 8,480,537 B2
(45) Date of Patent: Jul. 9, 2013

(54) HYBRID VEHICLE AND CONTROL METHOD THEREFOR

(75) Inventors: Yukihiro Sano, Fuji (JP); Ippei Suzuki, Hitachinaka (JP); Yuukou Nojiri, Hitachi (JP)

(73) Assignee: Jatco Ltd, Fuji-shi (JP)

( * ) Notice: Subject to any disclaimer, the term of this patent is extended or adjusted under 35 U.S.C. 154(b) by 84 days.

(21) Appl. No.: 13/281,891

(22) Filed: Oct. 26, 2011

(65) Prior Publication Data

US 2012/0108385 A1  May 3, 2012

(30) Foreign Application Priority Data

Nov. 2, 2010 (JP) .................................. 2010-245992

(51) Int. Cl.
*B60W 10/02* (2006.01)
*B60W 10/08* (2006.01)
*B60W 10/04* (2006.01)
*B60W 20/00* (2006.01)
*H02P 15/00* (2006.01)

(52) U.S. Cl.
USPC .................. 477/5; 477/6; 477/8; 180/65.285

(58) Field of Classification Search
USPC .................................. 477/5, 6, 8; 180/65.285
See application file for complete search history.

(56) References Cited

U.S. PATENT DOCUMENTS

| | | | |
|---|---|---|---|
| 6,183,389 B1 * | 2/2001 | Tabata | 477/5 |
| 6,692,402 B2 | 2/2004 | Nakamori et al. | |
| 7,089,095 B2 * | 8/2006 | Takami et al. | 701/22 |
| 7,730,982 B2 | 6/2010 | Hidaka et al. | |
| 2002/0091034 A1 | 7/2002 | Nakamori et al. | |
| 2006/0272869 A1 | 12/2006 | Hidaka et al. | |
| 2010/0075798 A1 | 3/2010 | Suzuki et al. | |

FOREIGN PATENT DOCUMENTS

| | | |
|---|---|---|
| JP | 2002-206630 A | 7/2002 |
| JP | 2007-015679 A | 1/2007 |
| JP | 2007-223442 A | 9/2007 |
| JP | 2010-076469 A | 4/2010 |

\* cited by examiner

*Primary Examiner* — Tisha Lewis
(74) *Attorney, Agent, or Firm* — Foley & Lardner LLP (57) ABSTRACT

The second clutch is caused to transition to an engaged state after setting the second clutch in a slip state when the vehicle starts in the hybrid start mode, the temperature of a magnet of the electric motor is estimated based on the temperature of the hydraulic oil and an operating condition of the electric motor when the second clutch is controlled to be in the slip state; and an output torque and a lower limit rotation speed of the electric motor is restricted and reduced when the estimated temperature of the magnet exceeds a restrictive temperature.

9 Claims, 6 Drawing Sheets

HYBRID VEHICLE AND CONTROL METHOD THEREFOR

FIELD OF THE INVENTION

The present invention relates to a control of a hybrid vehicle, particularly to a control of an electrical oil pump mounted in a hybrid vehicle.

BACKGROUND OF THE INVENTION

A hybrid vehicle is known which can travel using a drive source of at least one of an engine and a motor generator and in which a drive system is constructed by connecting the engine, a first clutch, the motor generator, a second clutch and drive wheels in this order. In such a hybrid vehicle, an EV mode in which the vehicle travels using only the motor generator as a power source is set by releasing the first clutch and engaging the second clutch to stop the engine, and an HEV mode in which the vehicle travels using the engine and the motor generator as power sources is set by engaging both the first and second clutches.

When the vehicle starts in the above HEV mode, the drive force of the engine may be suddenly transmitted to the drive wheels to cause a shock associated with a torque variation if the second clutch is switched from the released state to the engaged state. To prevent this, it is disclosed in JP2007-15679A to control the second clutch to be in a slip engagement state when the vehicle starts in the HEV mode (WSC control).

SUMMARY OF THE INVENTION

Hydraulic pressures supplied to the first clutch and the second clutch are produced by a mechanical oil pump driven and rotated by the engine and by an electrical oil pump driven and rotated by an electric motor, wherein the mechanical oil pump is mainly used in the HEV mode and the electrical oil pump is used in the EV motor.

Here, when the WSC control is being executed in the HEV mode and oil temperature is high, the electrical oil pump is actuated in addition to the mechanical oil pump to suppress heat generation by slip of the second clutch. This enables the second clutch to be lubricated and cooled by hydraulic oil supplied from the electrical oil pump in addition to by hydraulic oil supplied from the mechanical oil pump.

However, the temperature of an operating motor which drives the electrical oil pump increases due to the high oil temperature and also by self-heat generation caused by the drive of the operating motor. Accordingly, the temperature of a motor magnet provided in the operating motor also increases. If the temperature of the motor magnet increases and exceeds a predetermined demagnetization temperature, a magnetic force of the motor magnet is reduced. Even if the motor magnet is cooled thereafter, the magnetic force is not restored, whereby the performance of the electrical oil pump is reduced.

Accordingly, it is thought to stop the drive of the electrical oil pump when the oil temperature is high. However, the second clutch is insufficiently lubricated during the WSC control, which may possibly lead to deterioration of the second clutch due to overheating and a reduction in the travel performance of the vehicle.

An object of the present invention is to ensure a lubrication flow rate of a second clutch while preventing a reduction in the performance of an electrical oil pump when oil temperature is high.

According to an aspect of the present invention, a hybrid vehicle including an engine and a motor generator as drive sources, a first clutch interposed between the engine and the motor generator and released by supplying hydraulic oil, and a second clutch interposed between the motor generator and drive wheels and engaged by supplying the hydraulic oil, the hybrid vehicle being able to travel in a hybrid travel mode in which the engine and the motor generator are used as the drive sources by engaging the first clutch and the second clutch, is provided. The hybrid vehicle includes a mechanical oil pump which discharges the hydraulic oil by being driven by a drive force of the vehicle; an electrical oil pump which discharges the hydraulic oil by being driven by an electric motor for pump; a start-time slip control unit which causes the second clutch to transition to an engaged state after setting the second clutch in a slip state when the vehicle starts in the hybrid start mode; a motor temperature estimating unit which estimates the temperature of a magnet of the electric motor based on the temperature of the hydraulic oil and an operating condition of the electric motor when the second clutch is controlled to be in the slip state; and a motor restricting unit which restricts and reduces an output torque and a lower limit rotation speed of the electric motor when the estimated temperature of the magnet exceeds a restrictive temperature.

According to another aspect of the present invention, a control method for a hybrid vehicle including an engine and a motor generator as drive sources, a first clutch interposed between the engine and the motor generator and released by supplying hydraulic oil, a second clutch interposed between the motor generator and drive wheels and engaged by supplying the hydraulic oil, a mechanical oil pump which discharges the hydraulic oil by being driven by a drive force of the vehicle, and an electrical oil pump which discharges the hydraulic oil by being driven by an electric motor for pump, the hybrid vehicle being able to travel in a hybrid travel mode in which the engine and the motor generator are used as the drive sources by engaging the first clutch and the second clutch, is provided. The control method includes causing the second clutch to transition to an engaged state after setting the second clutch in a slip state when the vehicle starts in the hybrid start mode; estimating the temperature of a magnet of the electric motor based on the temperature of the hydraulic oil and an operating condition of the electric motor when the second clutch is controlled to be in the slip state; and restricting and reducing an output torque and a lower limit rotation speed of the electric motor when the estimated temperature of the magnet exceeds a restrictive temperature.

Embodiments and advantages of this invention will be described in detail below with reference to the attached figures.

DESCRIPTION OF THE PREFERRED EMBODIMENTS

First, the construction of a hybrid vehicle is described.

Figure 1:
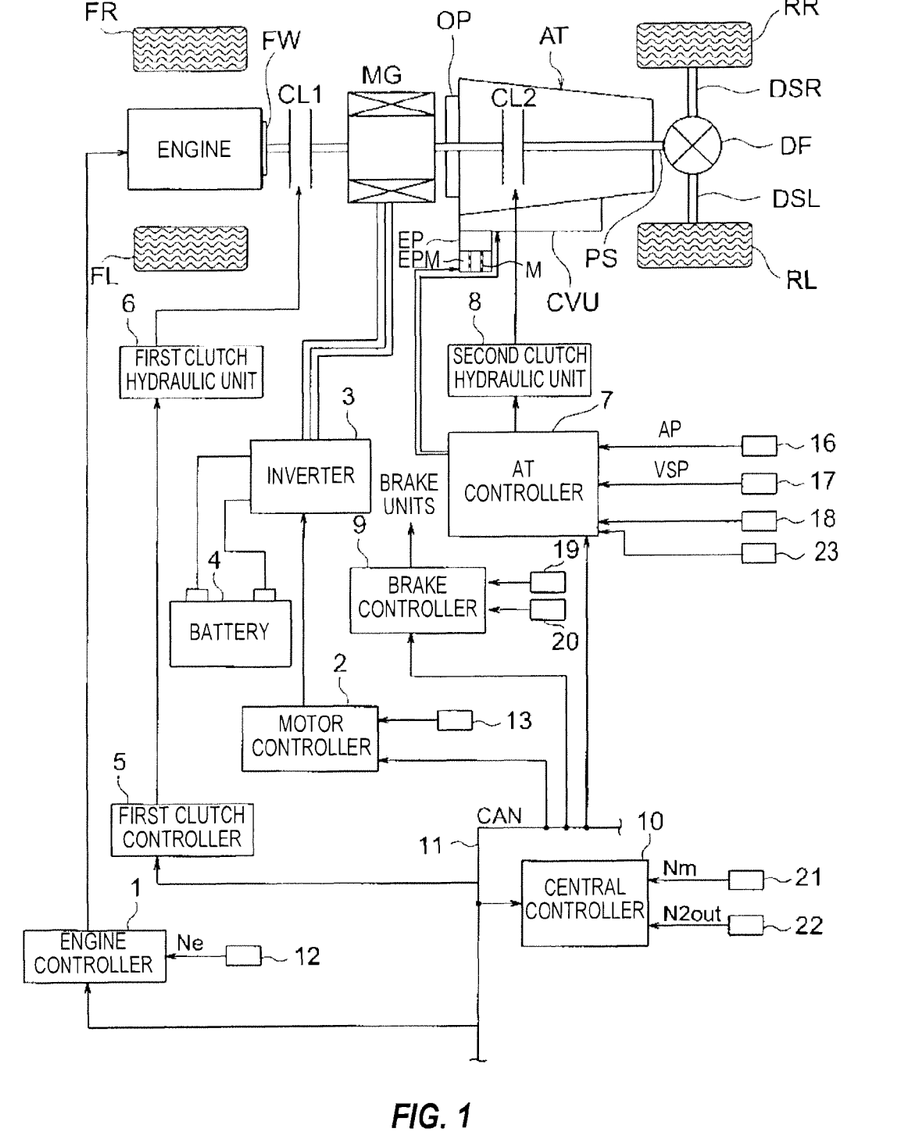
FIG. 1 is an overall system diagram showing a hybrid vehicle according to an embodiment.

FIG. 1 is an overall system diagram showing a rear-wheel drive hybrid vehicle (an example of a hybrid vehicle) according to this embodiment.

A drive system of the hybrid vehicle according to this embodiment includes, as shown in FIG. 1, an engine Eng, a flywheel FW, a first clutch CL1, a motor generator MG, an automatic transmission AT, a second clutch CL2, a propeller shaft PS, a differential DF, a left drive shaft DSL, a right drive shaft DSR, a left rear wheel RL (drive wheel), a right rear wheel RR (drive wheel), and a mechanical oil pump OP (mechanical oil pump).

The engine Eng is a gasoline engine or a diesel engine and an engine start control, an engine stop control and a valve opening control for a throttle valve are executed based on engine control commands from an engine controller 1. The flywheel FW is provided on an engine output shaft.

The first clutch CL1 is a clutch interposed between the engine Eng and the motor generator MG and released by supplying hydraulic oil, and engagement and release thereof including slip engagement and slip release are controlled by a first clutch control hydraulic pressure produced by a first clutch hydraulic unit 6 based on a first clutch control command from a first clutch controller 5.

The motor generator MG is a synchronous motor generator in which a permanent magnet is embedded in a rotor and a stator coil is wound around a stator, and controlled by applying a three-phase alternating current produced by an inverter 3 based on a control command from a motor controller 2. This motor generator MG can operate as an electric motor which is driven and rotated by the supply of power from a battery 4 (hereinafter, this state is called powering) and can also function as a generator for producing an electromotive force at the opposite ends of the stator coil and charge the battery 4 when the rotor receives rotational energy from the engine Eng and the left and right rear wheels RL, RR (hereinafter, this state is called regeneration). The rotor of this motor generator MG is connected to an input shaft of the automatic transmission AT via a damper.

The automatic transmission AT is, for example, a stepped transmission which automatically shifts stepped gear positions such as seven forward speeds and one reverse speed in accordance with a vehicle speed, an accelerator pedal opening and the like, and an output shaft thereof is connected to the left and right rear wheels RL, RR via the propeller shaft PS, the differential DF, the left drive shaft DSL and the right drive shaft DSR.

The second clutch CL2 is a clutch interposed between the motor generator MG and the left and right rear wheels RL, RR and engaged by supplying hydraulic oil, and engagement and release thereof including slip engagement and slip release are controlled by a control hydraulic pressure produced by a second clutch hydraulic unit 8 based on a second clutch control command from an AT controller 7. This second clutch CL2 is not newly added as a special clutch. Out of a plurality of frictional engagement elements to be engaged in the respective gear positions of the automatic transmission AT, an optimal clutch or brake arranged on a torque transmission path is selected. For example, a wet multiple disc clutch or a wet multiple disc brake capable of continuously controlling an oil flow rate and a hydraulic pressure using a proportional solenoid can be used.

Here, the first and second clutch hydraulic units 6, 8 are built in a hydraulic pressure control valve unit CVU attached to the automatic transmission AT. Further, this hydraulic pressure control valve unit CVU is provided with an electrical oil pump ER An internal gear pump, an external gear pump, a vane pump or the like that produces a discharge pressure using an electrical pump motor EPM as a power source is adopted as the electrical oil pump ER Discharge oil from this electrical oil pump EP is supplied to the first and second clutch hydraulic units 6, 8.

The pump motor EPM is a synchronous motor in which a permanent magnet M (hereinafter, referred to as a "motor magnet") is embedded in a rotor and a stator coil is wound around a stator, and controlled by applying a three-phase alternating current produced by the inventor 3 based on a control command from the motor controller 2 similar to the motor generator MG.

The mechanical oil pump OP is arranged between the motor generator MG and the second clutch CL2, and an internal gear pump, an external gear pump, a vane pump or the like that produces a discharge pressure using at least one of the engine Eng and the motor generator MG as a pump power source is adopted as such. Discharge oil from this mechanical oil pump OP is supplied to the first and second clutch hydraulic units 6, 8.

The drive system of this hybrid vehicle has two travel modes, i.e. a hybrid travel mode (hereinafter, referred to as a "HEV mode") in which the vehicle travels using the engine Eng and the motor generator MG as power sources by engaging the first clutch CL1 and an electric vehicle travel mode (hereinafter, referred to as an "EV mode") in which the vehicle travels using only the motor generator MG as a power source by releasing the first clutch CL1. A HEV-to-EV transition mode is set when a mode switch from the HEV mode to the EV mode is instructed, and an EV-to-HEV transition mode is set when a mode switch from the EV mode to the HEV mode is instructed.

Next, a control system of the hybrid vehicle is described.

The control system of the hybrid vehicle according to this embodiment includes, as shown in FIG. 1, the engine controller 1, the motor controller 2, the inverter 3, the battery 4, the first clutch controller 5, the first clutch hydraulic unit 6, the AT controller 7, the second clutch hydraulic unit 8, a brake controller 9 and a central controller 10. The engine controller 1, the motor controller 2, the first clutch controller 5, the AT controller 7, the brake controller 9 and the central controller 10 are connected via a CAN communication line 11 which enables mutual information exchange.

To the engine controller 1 are input an engine rotation speed Ne detected by an engine rotation speed sensor 12, a target engine torque command from the central controller 10 and other necessary information. The engine controller 1 outputs a command to control an engine operating point (Ne, Te) to a throttle valve actuator or the like of the engine Eng.

To the motor controller 2 are input a rotor rotational position of the motor generator MG detected by a resolver 13, a target MG torque command and a target MG rotation speed command from the central controller 10 and other necessary information. The motor controller 2 outputs a command to control a motor operating point (Nm, Tm) of the motor generator MG to the inverter 3. This motor controller 2 monitors a battery SOC indicating a charged state of the battery 4 and this battery SOC information is used in control information of the motor generator MG and supplied to the central controller 10 via the CAN communication line 11.

To the first clutch controller 5 are input a target CL1 torque command from the central controller 10 and other necessary information. The first clutch controller 5 outputs a command to control the engagement and release of the first clutch CL1 to the first clutch hydraulic unit 6 in the hydraulic pressure control valve unit CVU.

To the AT controller 7 is input information from an accelerator pedal opening sensor 16, a vehicle speed sensor 17 and a second clutch hydraulic sensor 18. When the vehicle travels with a D range selected, the AT controller 7 searches an optimal gear position based on a position in a shift map where an operating point determined by an accelerator pedal opening APO and a vehicle speed VSP is present, and outputs a gear position control command to achieve the searched gear position to the control valve unit CVU. The shift map is a map in which an upshift line and a downshift line corresponding to the acceleration pedal opening and the vehicle speed are written.

In addition to the above automatic transmission control, the AT controller 7 reads a target engine torque command, a target MG torque command and a target mode from the central controller 10 and outputs a line pressure control command to control a line pressure of the hydraulic oil, thereby controlling a line pressure produced by the control valve unit CVU.

Further, when a target CL2 torque command is input, the AT controller 7 executes a second clutch control to output a command to control the engagement and release of the second clutch CL2 to the second clutch hydraulic unit 8 in the hydraulic pressure control valve unit CVU. Further, the AT controller 7 receives temperature information of oil (ATF) used to lubricate the automatic transmission AT from an oil temperature sensor 23 and controls the pump motor EPM by outputting a motor torque command value.

To the brake controller 9 are input sensor information from a wheel speed sensor 19 for detecting respective wheel speeds of four wheels and a brake stroke sensor 20, a regenerative cooperative control command from the central controller 10 and other necessary information. For example, at the time of depressing a brake pedal for braking, the brake controller 9 executes a regenerative cooperative brake control to compensate for a deficiency by mechanical braking forces (fluid pressure braking force and motor braking force) if it is insufficient when only a regenerative braking force is given for a required braking force required for a brake stroke BS.

The central controller 10 has a function of managing consumption energy of the entire vehicle and causing the vehicle to travel with maximum efficiency. To the central controller 10 are input information from a motor rotation speed sensor 21 for detecting a motor rotation speed Nm, a second clutch output rotation speed sensor for detecting a second clutch output rotation speed N2out and the like and necessary information via the CAN communication line 11. The central controller 10 outputs a target engine torque command to the engine controller 1, a target MG torque command and a target MG rotation speed command to the motor controller 2, a target CL1 torque command to the first clutch controller 5, a target CL2 torque command to the AT controller 7 and a regenerative cooperative control command to the brake controller 9.

Figure 2:
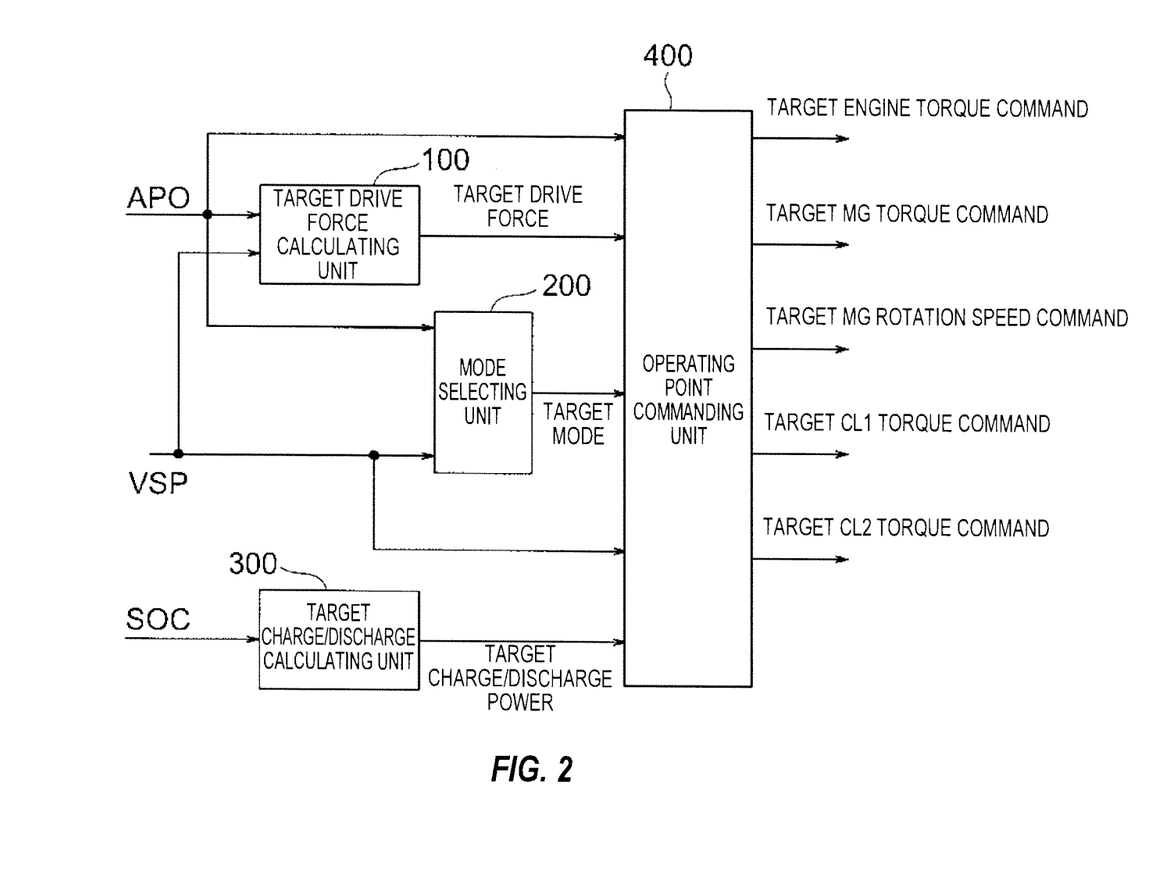
FIG. 2 is a control block diagram showing arithmetic processings performed by a central controller.
Figure 3:
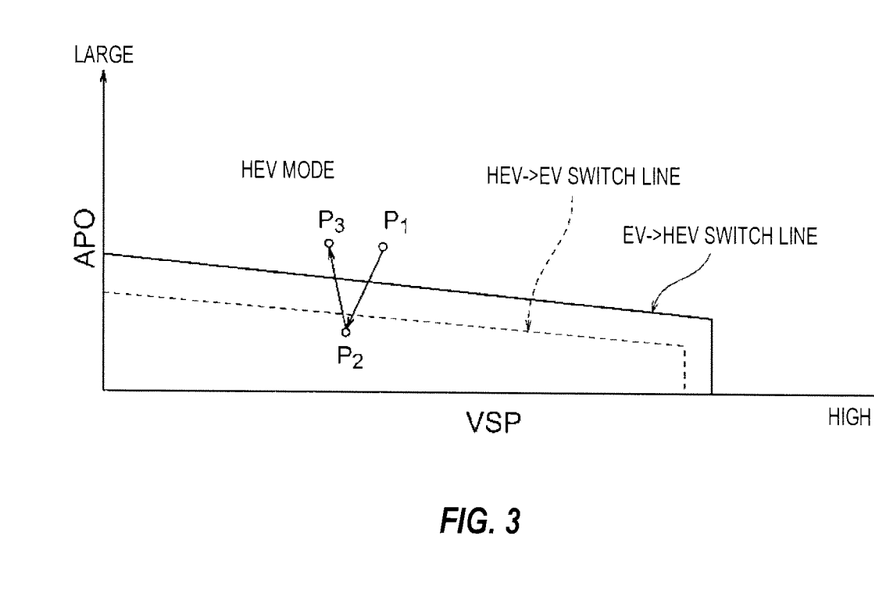
FIG. 3 is a travel mode selection map used in performing a mode selection processing in the central controller.

FIG. 2 is a control block diagram showing arithmetic processings performed by the central controller 10 of the hybrid vehicle according to this embodiment. FIG. 3 is a graph showing an EV-HEV selection map used in performing a mode selection processing in the central controller 10 of the hybrid vehicle. The arithmetic processings performed by the central controller 10 are described below with reference to FIGS. 2 and 3.

As shown in FIG. 2, the central controller 10 includes a target drive force calculating unit 100, a mode selecting unit 200, a target charge/discharge calculating unit 300 and an operating point commanding unit 400.

In the target drive force calculating unit 100, a target drive force tFo0 is calculated from the accelerator pedal opening APO and the vehicle speed VSP using a target drive force map.

In the mode selecting unit 200, the "EV mode" or the "HEV mode" is selected as a target travel mode from the accelerator pedal opening APO and the vehicle speed VSP using the EV-HEV selection map shown in FIG. 3. If the battery SOC is a predetermined value or lower, the "HEV mode" is forcibly set as the target travel mode.

In the target charge/discharge calculating unit 300, target charge/discharge power tP is calculated from the battery SOC using a target charge/discharge amount map.

In the operating point commanding unit 400, a target engine torque, a target MG torque, a target MG rotation speed, a target CIA torque and a target CL2 torque are calculated as operating-point achieving targets based on the accelerator pedal opening APO, the target drive force tFo0, the target travel mode, the vehicle speed VSP, the target charge/discharge power tP and the like. Then, a target engine torque command, a target MG torque command, a target MG rotation speed command, a target CL1 torque command and a target CL2 torque command are output to the respective controllers 1, 2, 5 and 7 via the CAN communication line 11.

In the hybrid vehicle as described above, the drive force of the engine Eng is suddenly transmitted to the drive wheels to cause a shock associated with a torque variation if the second clutch CL2 is switched from the released state to the engaged state when the vehicle starts in the HEV mode. Thus, the second clutch CL2 is controlled to be in a slip engagement state only for a predetermined period after the start (hereinafter, this control is referred to as a "WSC control"). That is, a drive force variation is absorbed by slip of the second clutch CL2.

Since the second clutch CL2 is held in a slip state during the above WSC control, the amount of oil supplied to the second clutch CL2 needs to be increased for lubrication and cooling. Accordingly, when oil temperature is high, the electrical oil pump EP is actuated in addition to the already actuated mechanical oil pump OP.

However, the temperature of the pump motor EPM that drives the electrical oil pump EP increases due to high oil temperature and also increases due to self-heat generation by the drive of the pump motor EPM. This is accompanied by a temperature increase of the motor magnet M provided in the pump motor EPM. When the temperature of the motor magnet M exceeds a predetermined demagnetization limit temperature, a magnetic force is reduced and, even if being cooled thereafter, the magnetic force is not restored. This causes the performance of the electrical oil pump EP to be reduced.

Accordingly, in a range where the oil temperature is equal to or above the demagnetization limit temperature, the actuation of the electrical oil pump EP is stopped. However, this makes lubrication of the second clutch CL2 during the WSC control insufficient, which may possibly lead to deterioration of the second clutch due CL2 to overheating and a reduction in the travel performance of the vehicle.

Accordingly, in this embodiment, the AT controller 7 executes the following control.

Figure 4:
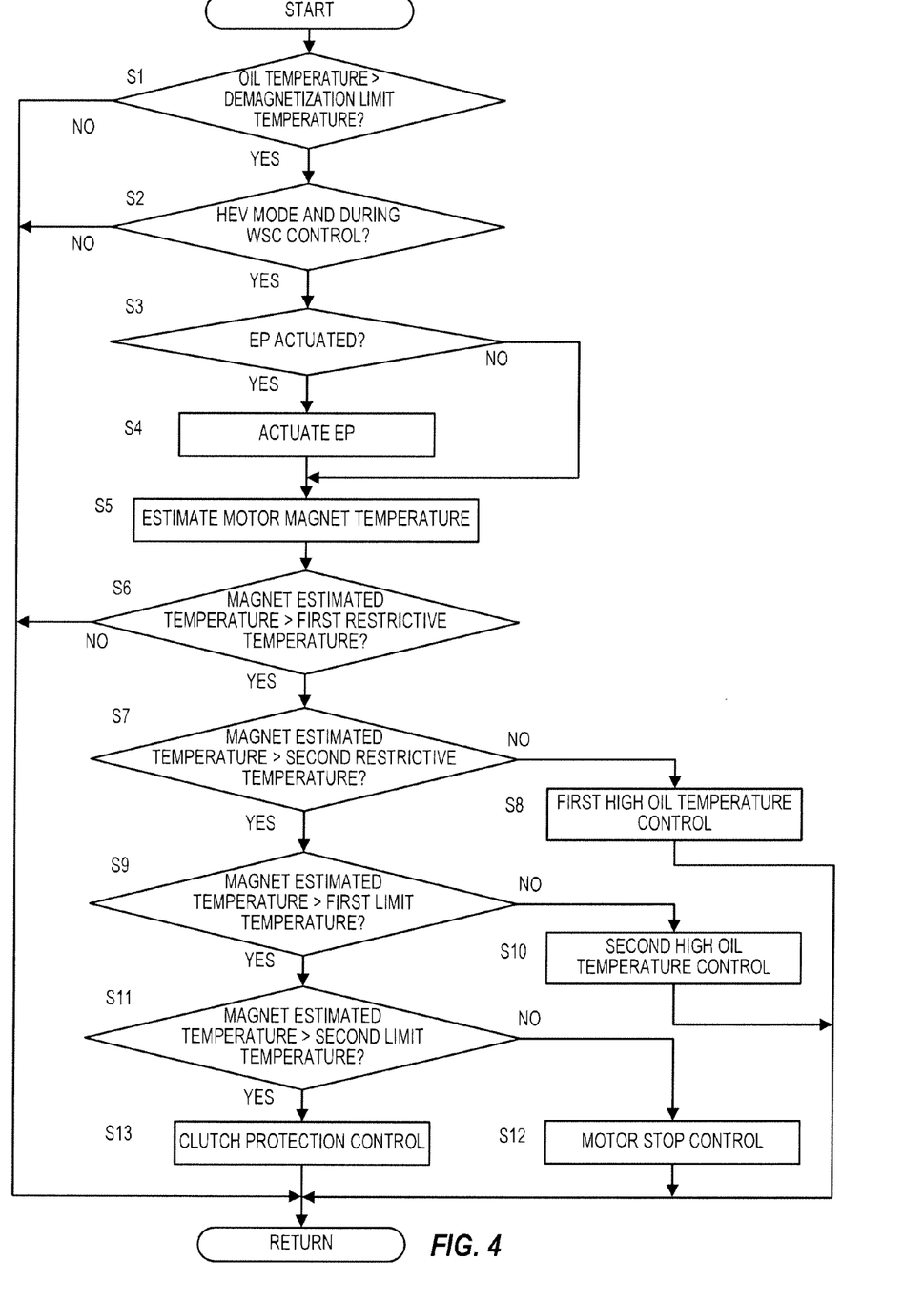
FIG. 4 is a flow chart showing the flow of arithmetic processings performed by an AT controller.

FIG. 4 is a flow chart showing the flow of a control process of the pump motor EPM performed by the AT controller 7. This process is repeatedly performed at every interval of a very short time (e.g. 10 ms).

In Step S1, the AT controller 7 determines whether or not the oil temperature is higher than the demagnetization limit temperature. The process proceeds to Step S2 in the case of YES in determination, and ends in the case of NO. Here, the oil temperature is the temperature of oil used for lubrication of the second clutch CL2 arid, in this embodiment, the temperature of ATF used for lubrication of the automatic transmission AT. The demagnetization limit temperature (e.g. 107° C.) is set around a maximum temperature at which the motor magnet M is not demagnetized, and the motor magnet M is possibly demagnetized if the oil temperature further increases beyond the demagnetization limit temperature.

In Step S2, the AT controller 7 determines whether or not the travel mode of the vehicle is the HEV mode and the WSC control is being executed. The process proceeds to Step S3 in the case of YES in determination, and ends in the case of NO.

In Step S3, the AT controller 7 determines whether or not the electrical oil pump EP is being actuated. The process proceeds to Step S4 in the case of YES in determination, and proceeds to Step S5 in the case of NO.

In Step S4, the AT controller 7 actuates the electrical oil pump EP and advances the process to Step S5.

In Step S5, the AT controller 7 estimates the temperature of the motor magnet M and advances the process to Step S6. Here, the temperature of the motor magnet M is calculated by adding a temperature increase caused by self-heat generation of the pump motor EPM to the present oil temperature. The temperature increase caused by self-heat generation of the pump motor EPM is calculated based on a map showing a relationship between the torque and rotation speed of the pump motor EPM and a heat generation amount, and this map is stored in the AT controller 7 beforehand.

In Step S6, the AT controller 7 determines whether or not the estimated temperature of the motor magnet M is higher than a first restrictive temperature. The process proceeds to Step S7 in the case of YES in determination, and ends in the case of NO. Here, the first restrictive temperature is set around the maximum temperature (e.g. 106° C.) at which the motor magnet M is not demagnetized.

In Step S7, the AT controller 7 determines whether or not the estimated temperature of the motor magnet M is higher than a second restrictive temperature. The process proceeds to Step S9 in the case of YES in determination, and proceeds to Step S8 in the case of NO. Here, the second restrictive temperature is set at a temperature (e.g. 120° C.) at which the motor magnet M is possibly demagnetized and which is higher than the first restrictive temperature.

In Step S8, the AT controller 7 executes a first high oil temperature control. This control is described later.

In Step S9, the AT controller 7 determines whether or not the estimated temperature of the motor magnet M is higher than a first limit temperature. The process proceeds to Step S11 in the case of YES in determination, and proceeds to Step S10 in the case of NO. Here, the first limit temperature is a temperature (e.g. 160° C.) at which the motor magnet M is possibly demagnetized and which is higher than the second restrictive temperature.

In Step S10, the AT controller 7 executes a second high oil temperature control. This control is described later.

In Step S11, the AT controller 7 determines whether or not the estimated temperature of the motor magnet M is higher than a second limit temperature. The process proceeds to Step S13 in the case of YES in determination, and proceeds to Step S12 in the case of NO. Here, the second limit temperature is a temperature (e.g. 180° C.) at which the motor magnet M is possibly demagnetized and which is higher than the first limit temperature.

The AT controller 7 executes a motor stop control in Step S12 and executes a clutch protection control in Step S13.

Figure 5A:
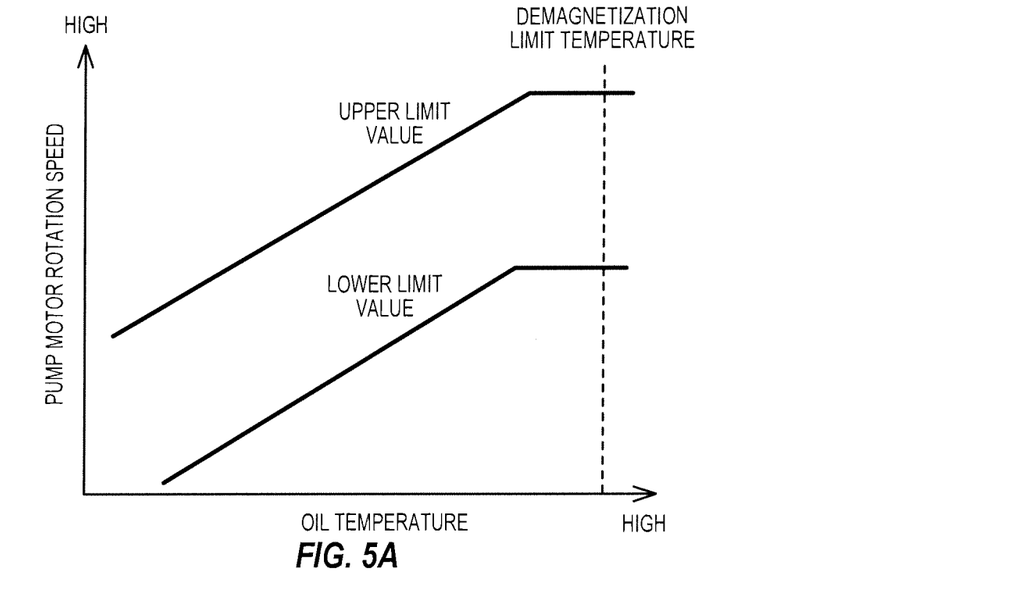
FIG. 5A is a map used in specifying a rotational speed of a pump motor.
Figure 5B:
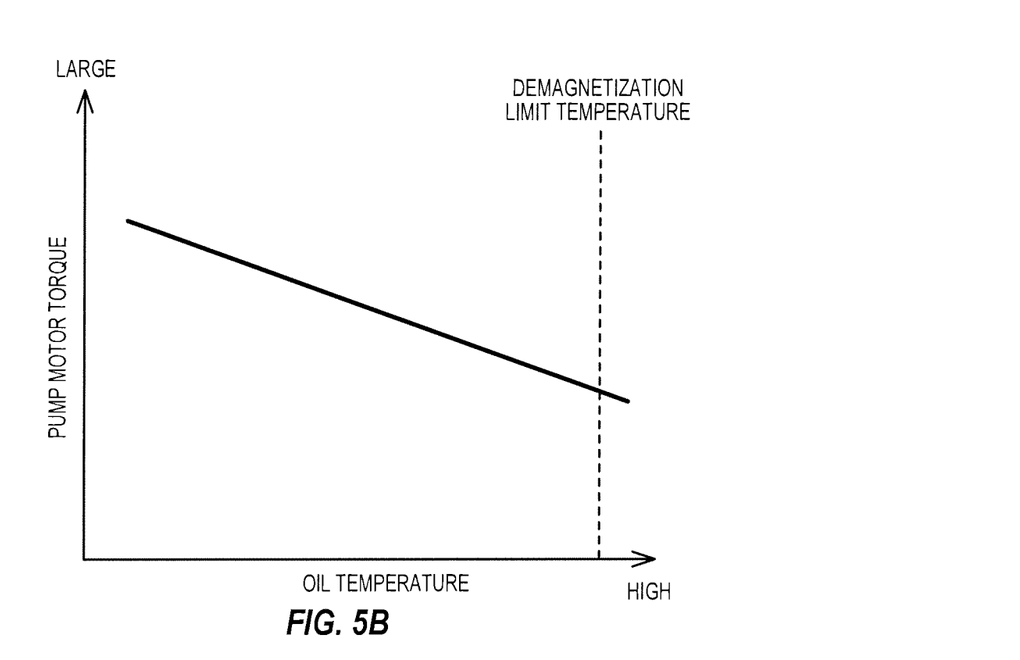
FIG. 5B is a map used in specifying a torque of the pump motor.
Figure 6A:
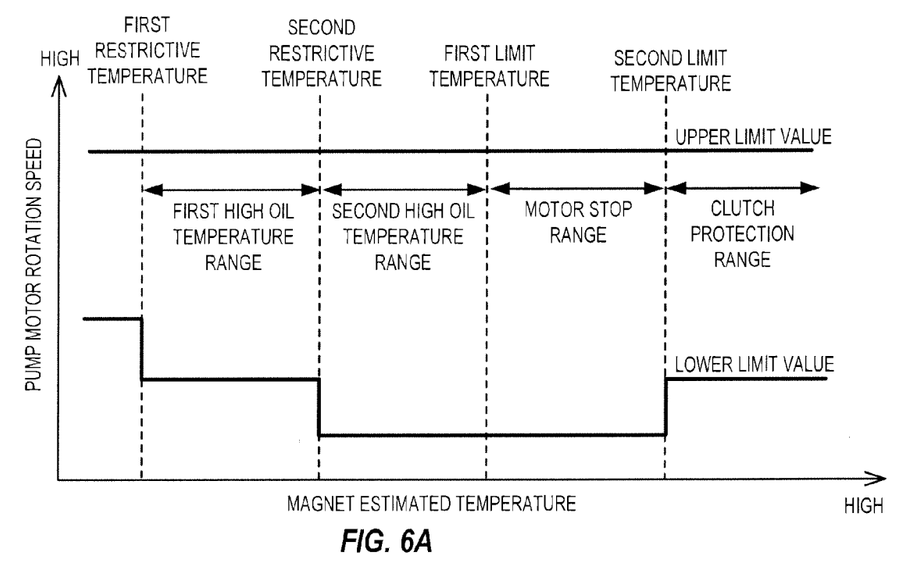
FIG. 6A is a map used in specifying the rotational speed of the pump motor.
Figure 6B:
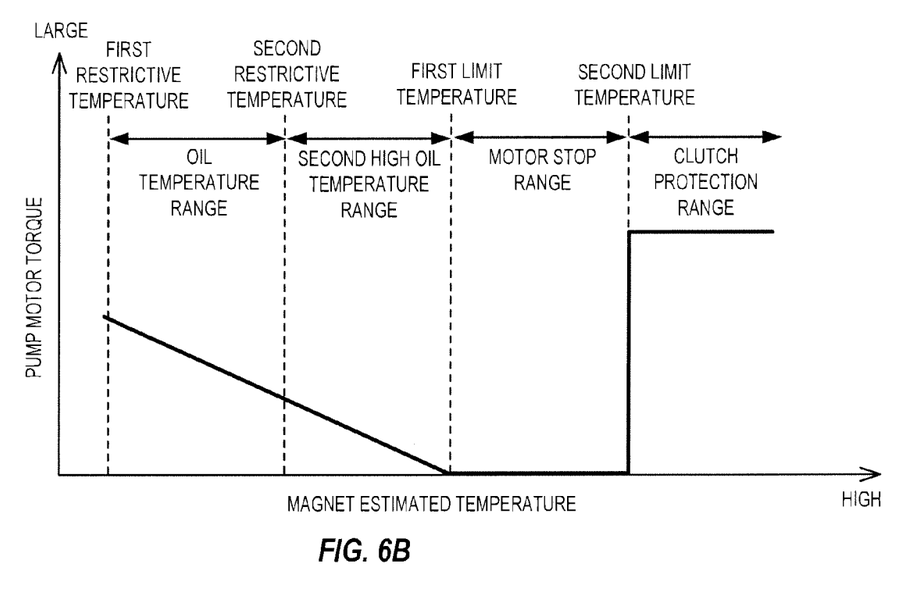
FIG. 6B is a map used in specifying the torque of the pump motor.

Here, the respective controls executed in the above Steps S8, S10, S12 and S13 are described. FIGS. 5A and 5B are maps which specify a relationship between the oil temperature and the rotation speed and torque of the pump motor EPM. FIGS. 6A and 6B are maps which specify a relationship between the estimated temperature of the motor magnet M and the rotation speed and torque of the pump motor EPM.

The torque and rotation speed of the pump motor EPM are set based on FIGS. 5A and 5B until the oil temperature is determined to be higher than the demagnetization limit temperature in Step S1, and set based on FIGS. 6A and 6B according to the temperature of the motor magnet M after the oil temperature exceeds the demagnetization limit temperature.

The pump motor EPM is torque-controlled according to the oil temperature. Since the viscosity of the oil is reduced as the oil temperature increases, the torque is reduced by that much (FIG. 5B). Further, since the rotation speed of the pump motor EPM changes according to a load, an upper limit value and a lower limit value of the rotation speed are set and the rotation speed of the pump motor EPM is so controlled as to fall within a range between the both limit values to prevent step-out (FIG. 5A). Since an oil leak amount increases as the oil temperature increases, the upper and lower limit values are increased with an increase in the oil temperature to ensure an oil amount.

Conventionally, the actuation of the pump motor EPM has been stopped to prevent demagnetization of the motor magnet M if the oil temperature exceeds the demagnetization limit temperature. However, in this embodiment, the pump motor EPM is not immediately stopped and controlled as follows according to the estimated temperature of the motor magnet M even if the oil temperature is determined to have exceeded the demagnetization limit temperature in Step S1.

That is, in Step S8 performed when the estimated temperature of the motor magnet M is higher than the first restrictive temperature and equal to or lower than the second restrictive temperature, a torque command value of the pump motor EPM is more restricted (reduced) than in normal time as the first high oil temperature control. A restriction amount is set with reference to the map of FIG. 6B so that the higher the estimated temperature of the motor magnet M, the lower the torque. Further, since the rotation speed also decreases with a decrease in the torque command value at this time, the lower limit value of the rotation speed is reduced (FIG. 6A).

Furthermore, an interval of a retry performed when the pump motor EPM loses steps is set to be longer than in normal time. In the pump motor EPM, step-out is constantly monitored and a return is made by resetting a command value to the pump motor EPM once in the case of step-out. However, since the pump motor EPM generates more heat during a retry than during a normal operation, the retry interval is set to be longer than in normal time to prioritize a reduction of a heat generation amount over the return from the step-out. In this way, the heat generation amount of the pump motor EPM is suppressed.

In Step S10 performed when the estimated temperature of the motor magnet M is higher than the second restrictive temperature and equal to or lower than the first limit temperature, the torque command value of the pump motor EPM is further restricted (reduced) than in the first high oil temperature control as the second high oil temperature control. A restriction amount is set with reference to the map of FIG. 6B so that the higher the estimated temperature of the motor magnet M, the lower the torque. Further, since the rotation speed also decreases with a decrease in the torque command value at this time, the lower limit value of the rotation speed is reduced (FIG. 6A).

Further, similar to the first high oil temperature control, the interval of the retry performed when the pump motor EPM loses steps is set to be longer than in normal time. In this way, the heat generation amount of the pump motor EPM is suppressed.

In Step S12 performed when the estimated temperature of the motor magnet M is higher than the first limit temperature and equal to or lower than the second limit temperature, the torque command value of the pump motor EPM is set to zero as the motor stop control (FIG. 6B). In this way, the actuation of the pump motor EPM is stopped.

In Step S13 performed when the estimated temperature of the motor magnet M is higher than the second limit temperature, torque restriction of the pump motor EPM is lifted and a maximum torque command value in normal time is set as clutch protection control (FIG. 6B). In accordance with this, the lower limit value of the rotation speed is increased (FIG. 6A). In this way, the clutch protection control is a control to prioritize lubrication and cooling of the second clutch CL2 over prevention of demagnetization of the motor magnet M.

Further, the interval of the retry performed when the pump motor EPM loses steps is set to be longer than in normal time similar to the first high oil temperature control. In this way, the heat generation amount of the pump motor EPM is suppressed.

By the above controls, particularly by the first high oil temperature control (S8) and the second high oil temperature control (S10), an operating range of the pump motor EPM is enlarged and the pump motor EPM can be actuated even in a temperature range where the pump motor EPM has been conventionally stopped. Thus, the second clutch CL2 can be sufficiently lubricated and cooled.

Further, in a range where the oil temperature increases and the estimated temperature of the motor magnet M exceeds the second limit temperature, the output of the pump motor EPM is maximized and securement of the lubrication flow rate of the second clutch CL2 is prioritized over prevention of demagnetization of the motor magnet M by the clutch protection control. Thus, deterioration of the second clutch CL2 when the oil temperature is high can be prevented.

As described above, in this embodiment, the temperature of the motor magnet M is estimated and the output torque and lower limit rotation speed of the pump motor EPM are restricted and reduced when the estimated temperature exceeds the first restrictive temperature while the vehicle is traveling in the HEV mode and the WSC control is being executed. Thus, it can be prevented that the motor magnet M reaches the demagnetization temperature to be demagnetized even when the oil temperature is high and the operating range of the electrical oil pump EP can be enlarged to a higher temperature side. Therefore, a higher lubrication flow rate of the second clutch CL2 particularly when the oil temperature is high can be ensured.

Since the output of the pump motor EPM is controlled based on the estimated temperature of the motor magnet M, it can be prevented that the output of the pump motor EPM is unnecessarily restricted and the second clutch CL2 can be more reliably lubricated when the oil temperature is high and the temperature of the motor magnet M is lower than the oil temperature.

When the estimated temperature of the motor magnet M exceeds the first restrictive temperature, the output torque and lower limit rotation speed of the pump motor EPM are reduced by the first high oil temperature control and, in addition, more reduced than in the first high oil temperature control by the second high oil temperature control when the estimated temperature exceeds the second restrictive temperature. Thus, a temperature increase of the motor magnet M can be suppressed by reducing the torque and rotation speed of the pump motor EPM according to an increase in the oil temperature. Therefore, the pump motor EPM can be actuated up to the vicinity of the demagnetization limit and the second clutch CL2 can be more reliably lubricated by ensuring the amount of oil discharged from the electrical oil pump EP even when the oil temperature is high.

Further, when the estimated temperature of the motor magnet M exceeds the second limit temperature, restriction on the output torque and lower limit rotation speed of the pump motor EPM is lifted and the maximum torque in normal time is set. Thus, it is possible to ensure the lubrication flow rate to the second clutch CL2 and prevent overheating of the second clutch CL2.

The embodiment of the present invention has been described above. The above embodiment is merely an illustration of an application example of the present invention and not of the nature to limit the technical scope of the present invention to the specific construction of the above embodiment. Various changes can be made without departing from the gist of the present invention.

This application claims priority based on Japanese Patent Application No. 2010-245992, filed with the Japan Patent Office on Nov. 2, 2010, the entire content of which is incorporated into this specification by reference.

What is claimed is:

1. A hybrid vehicle including an engine and a motor generator as drive sources, a first clutch interposed between the engine and the motor generator and released by supplying hydraulic oil, and a second clutch interposed between the motor generator and drive wheels and engaged by supplying the hydraulic oil, the hybrid vehicle being able to travel in a hybrid travel mode in which the engine and the motor generator are used as the drive sources by engaging the first clutch and the second clutch, comprising:
   a mechanical oil pump which discharges the hydraulic oil by being driven by a drive force of the vehicle;
   an electrical oil pump which discharges the hydraulic oil by being driven by an electric motor for pump;
   a start-time slip control unit which causes the second clutch to transition to an engaged state after setting the second clutch in a slip state when the vehicle starts in the hybrid start mode;
   a motor temperature estimating unit which estimates the temperature of a magnet of the electric motor based on the temperature of the hydraulic oil and an operating condition of the electric motor when the second clutch is controlled to be in the slip state; and
   a motor restricting unit which restricts and reduces an output torque and a lower limit rotation speed of the electric motor when the estimated temperature of the magnet exceeds a restrictive temperature.

2. The hybrid vehicle according to claim 1, wherein:
   the motor restricting unit reduces the output torque and lower limit rotation speed of the electric motor more as the estimated temperature of the magnet increases.

3. The hybrid vehicle according to claim 1, wherein:
   the motor restricting unit lifts restriction on the output torque and lower limit rotation speed of the electric motor when the estimated temperature of the magnet exceeds a limit temperature higher than the restrictive temperature.

4. A control method for a hybrid vehicle including an engine and a motor generator as drive sources, a first clutch interposed between the engine and the motor generator and released by supplying hydraulic oil, a second clutch interposed between the motor generator and drive wheels and engaged by supplying the hydraulic oil, a mechanical oil pump which discharges the hydraulic oil by being driven by a drive force of the vehicle, and an electrical oil pump which discharges the hydraulic oil by being driven by an electric motor for pump, the hybrid vehicle being able to travel in a hybrid travel mode in which the engine and the motor generator are used as the drive sources by engaging the first clutch and the second clutch, comprising:

causing the second clutch to transition to an engaged state after setting the second clutch in a slip state when the vehicle starts in the hybrid start mode;

estimating the temperature of a magnet of the electric motor based on the temperature of the hydraulic oil and an operating condition of the electric motor when the second clutch is controlled to be in the slip state; and restricting and reducing an output torque and a lower limit rotation speed of the electric motor when the estimated temperature of the magnet exceeds a restrictive temperature.

5. The hybrid vehicle according to claim 4, wherein:
the restricting reduces the output torque and lower limit rotation speed of the electric motor more as the estimated temperature of the magnet increases.

6. The hybrid vehicle according to claim 4, wherein:
the restricting lifts restriction on the output torque and lower limit rotation speed of the electric motor when the estimated temperature of the magnet exceeds a limit temperature higher than the restrictive temperature.

7. A hybrid vehicle including an engine and a motor generator as drive sources, a first clutch interposed between the engine and the motor generator and released by supplying hydraulic oil, and a second clutch interposed between the motor generator and drive wheels and engaged by supplying the hydraulic oil, the hybrid vehicle being able to travel in a hybrid travel mode in which the engine and the motor generator are used as the drive sources by engaging the first clutch and the second clutch, comprising:

a mechanical oil pump which discharges the hydraulic oil by being driven by a drive force of the vehicle;

an electrical oil pump which discharges the hydraulic oil by being driven by an electric motor for pump;

start-time slip control means for causing the second clutch to transition to an engaged state after setting the second clutch in a slip state when the vehicle starts in the hybrid start mode;

motor temperature estimating means for estimating the temperature of a magnet of the electric motor based on the temperature of the hydraulic oil and an operating condition of the electric motor when the second clutch is controlled to be in the slip state; and motor restricting means for restricting and reducing an output torque and a lower limit rotation speed of the electric motor when the estimated temperature of the magnet exceeds a restrictive temperature.

8. The hybrid vehicle according to claim 7, wherein:
the motor restricting means reduces the output torque and lower limit rotation speed of the electric motor more as the estimated temperature of the magnet increases.

9. The hybrid vehicle according to claim 7, wherein:
the motor restricting means lifts restriction on the output torque and lower limit rotation speed of the electric motor when the estimated temperature of the magnet exceeds a limit temperature higher than the restrictive temperature.

* * * * *